United States Patent
Lookman

(10) Patent No.: US 10,015,857 B2
(45) Date of Patent: Jul. 3, 2018

(54) METHOD AND APPARATUS FOR REDUCING FLICKERING OF EMITTED LIGHT

(71) Applicant: ROHM CO., LTD., Ukyo-ku, Kyoto (JP)

(72) Inventor: Paulo Lookman, Kyoto (JP)

(73) Assignee: ROHM CO., LTD., Kyoto (JP)

(*) Notice: Subject to any disclaimer, the term of this patent is extended or adjusted under 35 U.S.C. 154(b) by 0 days.

(21) Appl. No.: 15/592,683

(22) Filed: May 11, 2017

(65) Prior Publication Data

US 2017/0332452 A1    Nov. 16, 2017

(30) Foreign Application Priority Data

May 13, 2016   (EP) .................... 16169707

(51) Int. Cl.
*H05B 33/08*   (2006.01)
*B60Q 1/14*   (2006.01)

(52) U.S. Cl.
CPC ....... *H05B 33/0845* (2013.01); *H05B 33/083* (2013.01); *H05B 33/089* (2013.01); *H05B 33/0896* (2013.01); *B60Q 1/1415* (2013.01)

(58) Field of Classification Search
None
See application file for complete search history.

(56) References Cited

U.S. PATENT DOCUMENTS

2011/0163680 A1*   7/2011   Welten ............... H05B 33/0818
315/186

* cited by examiner

*Primary Examiner* — Jany Richardson
(74) *Attorney, Agent, or Firm* — Cantor Colburn LLP

(57) ABSTRACT

A light emitting apparatus including: a light emitting array having at least one light emitting string of serial connected light emitting elements, wherein a bypass switch is connected in parallel to each light emitting element of said light emitting string; and a driving control unit controlling a shift timing of the bypass switches to reduce a variation of a voltage drop across the light emitting string.

10 Claims, 10 Drawing Sheets

METHOD AND APPARATUS FOR REDUCING FLICKERING OF EMITTED LIGHT

CROSS-REFERENCE TO RELATED APPLICATION(S)

The present invention claims priority under 35 U.S.C. § 119 to European Patent Application No. 16169707.3, filed May 13, 2016, the entire contents of which are incorporated herein by reference.

TECHNICAL FIELD

The present disclosure relates to a method and apparatus for reducing flickering of light emitted by a light emitting string of serial connected light emitting elements.

BACKGROUND

Conventional light emitting systems can include light emitting elements such as light emitting diodes LED which are serial connected to each other to form a light emitting string of light emitting elements. Such a light emitting string can form part of a light emitting lamp which can be used for instance as a head lamp in a vehicle. When switching the light emitting elements within the light emitting string, a stroboscopic effect is caused. The stroboscopic effect is a visual phenomenon caused by an aliasing that occurs when continuous motion is represented by a series of short or instantaneous samples. Moreover, the quality of the emitted light is reduced by flickering due to the switching of the light emitting elements within the light emitting string.

SUMMARY

The present disclosure provides some embodiments of a method or an apparatus which provide emitted light with reduced flickering.

A first aspect of the present disclosure provides a light emitting apparatus including the features of claim 1.

According to the first aspect of the present disclosure, a light emitting apparatus is provided including: a light emitting array having at least one light emitting string of serial connected light emitting elements, wherein a bypass switch is connected in parallel to each light emitting element of said light emitting string; and a driving control unit controlling a shift timing of the bypass switches to reduce a variation of a voltage drop across the light emitting string.

The light emitting apparatus according to the first aspect of the present disclosure does reduce the flickering of the emitted light and/or reduces the stroboscopic effect caused by the emitted light.

Further, the light emitting apparatus according to the first aspect of the present disclosure has the additional advantage that it is adapted to reduce EMC problems.

Further, the light emitting apparatus according to the first aspect of the present disclosure reduces the output voltage variation of the current driver of the light emitting element of said light emitting string.

In a possible embodiment of the light emitting apparatus according to the first aspect of the present disclosure, the driving control unit includes for each light emitting element a control logic adapted to generate a PWM control signal for the associated bypass switch of said light emitting element.

In a further possible embodiment of the light emitting apparatus according to the first aspect of the present disclosure, the light emitting element is turned off if the associated parallel connected bypass switch is switched on in response to the PWM control signal output by the control logic of said light emitting element provided within said driving control unit.

In a further possible embodiment of the light emitting apparatus according to the first aspect of the present disclosure, the light emitting element connected in series with other light emitting elements within the light emitting string is turned on if the previous light emitting element within the light emitting string is turned off.

In a further possible embodiment of the light emitting apparatus according to the first aspect of the present disclosure, the PWM control signal output by the control logic of a light emitting element for the bypass switch associated with said light emitting element includes a shift time period, wherein after expiry of the shift time period, the bypass switch is switched off and the corresponding light emitting element is turned on.

In a still further possible embodiment of the light emitting apparatus according to the first aspect of the present disclosure, for the shift time period, a corresponding shift time counter value is stored in a first register of the control logic of the respective light emitting element.

In a further possible embodiment of the light emitting apparatus according to the first aspect of the present disclosure, the PWM control signal output by the control logic of a light emitting element for the bypass switch associated with the respective light emitting element includes an on-time period, wherein after expiry of the on-time period, the bypass switch is switched on and the corresponding light emitting element is turned off.

In a still further possible embodiment of the light emitting apparatus according to the first aspect of the present disclosure, for the sum of the shift time period and the on-time period, a corresponding off-time counter value is stored in a second register of the control logic of said light emitting element.

In a still further possible embodiment of the light emitting apparatus according to the first aspect of the present disclosure, the control logic of the light-emitting element includes: a first comparator adapted to generate a trigger pulse to switch off automatically the bypass switch associated with the respective light emitting element to turn on the light emitting element if a counter value generated by a digital counter unit is equal to the shift time counter value stored in the first register of the control logic of the respective light emitting element; and a second comparator adapted to generate a trigger pulse to switch on automatically the bypass switch associated with the respective light emitting element to turn off the light emitting element if the counter value generated by the digital counter unit is equal to the off-time counter value stored in the second register of the control logic of the respective light emitting element.

In a still further possible embodiment of the light emitting apparatus according to the first aspect of the present disclosure, the bypass switch is a MOSFET having a gate terminal connected to the control logic of the respective light emitting element to receive the PWM control signal generated by said control logic.

In a further possible embodiment of the light emitting apparatus according to the first aspect of the present disclosure, the light emitting elements include light emitting diodes LEDs.

In a further possible embodiment of the light emitting apparatus according to the first aspect of the present disclosure, the light emitting elements include OLEDs.

The present disclosure provides according to a second aspect a method for reducing flickering of light emitted by a light emitting string including the features of claim 13.

The present disclosure provides according to the second aspect a method for reducing flickering of light emitted by a light emitting string of serial connected light emitting elements, each having a bypass switch connected in parallel to the associated light emitting element, wherein a shift timing of the bypass switches is controlled by a driving control unit to reduce a variation of a voltage drop across the light emitting string.

The present disclosure provides according to a further aspect a LED controller including the features of claim 14.

The present disclosure provides according to the third aspect a LED controller configured to control a shift timing of bypass switches connected in parallel to light emitting elements of at least one light emitting string to reduce a variation of a voltage drop across the light emitting string.

The present disclosure further provides according to a further aspect a light emitting system including the features of claim 14.

The present disclosure provides according to this aspect a light emitting system including at least one LED controller including the features of claim 13 adapted to control at least one light emitting string of said light emitting system.

BRIEF DESCRIPTION OF THE DRAWINGS

In the following, possible embodiments of the different aspects of the present disclosure are described in more detail with reference to the enclosed figures.

DETAILED DESCRIPTION

Figure 1:
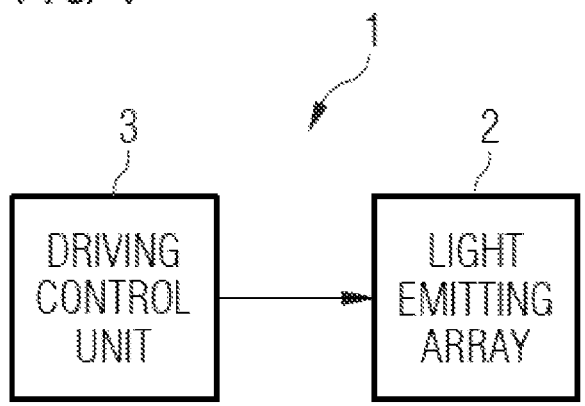
FIG. 1 shows a block diagram of a possible exemplary embodiment of a light emitting apparatus according to the first aspect of the present disclosure.

As can be seen in FIG. 1, a light emitting apparatus 1 according to the first aspect of the present disclosure includes in the illustrated embodiment a light emitting array 2 controlled by a driving control circuit 3. The light emitting array 2 includes in a possible embodiment at least one light emitting string of serial connected light emitting elements. The light emitting elements can include in a possible embodiment light emitting diodes LEDs. In a further possible embodiment, the light emitting elements can also include OLEDs. The light emitting elements of the light emitting string are serial connected to each other. A bypass switch is connected in parallel to each light emitting element of the light emitting string. The light emitting array 2 of the light emitting apparatus 1 can include one or several light emitting strings connected in parallel to each other.

The light emitting apparatus 1 according to the first aspect of the present disclosure includes in the illustrated embodiment of FIG. 1 a driving control unit 3. The driving control unit 3 is configured to control a shift timing of the bypass switches within the light emitting array 2 to reduce a variation of a voltage drop across the light emitting string of the light emitting array 2. The driving control unit 3 includes for each light emitting element a control logic adapted to generate a PWM control signal for the associated bypass switch of the light emitting element. The light emitting element is turned off if the associated parallel connected bypass switch is switched on in response to the PWM control signal output by the control logic of the respective light emitting element provided within the driving control unit 3. Further, the light emitting element and the light emitting array 2 are turned off if the associated parallel connected bypass switch is switched on in response to the PWM control signal output by the control logic of the light emitting element provided within the driving control unit 3.

The light emitting element within the light emitting string of said light emitting array 2 being connected in series with other light emitting elements within the same light emitting string of said light emitting array 2 is turned on if the previous light emitting element within the respective light emitting string is turned off. The PWM control signal output by the control logic of a light emitting element for the bypass switch associated with the light emitting element includes a shift time period. After expiry of the shift time period, the bypass switch is switched off and the corresponding light emitting element is turned on.

Figure 2:
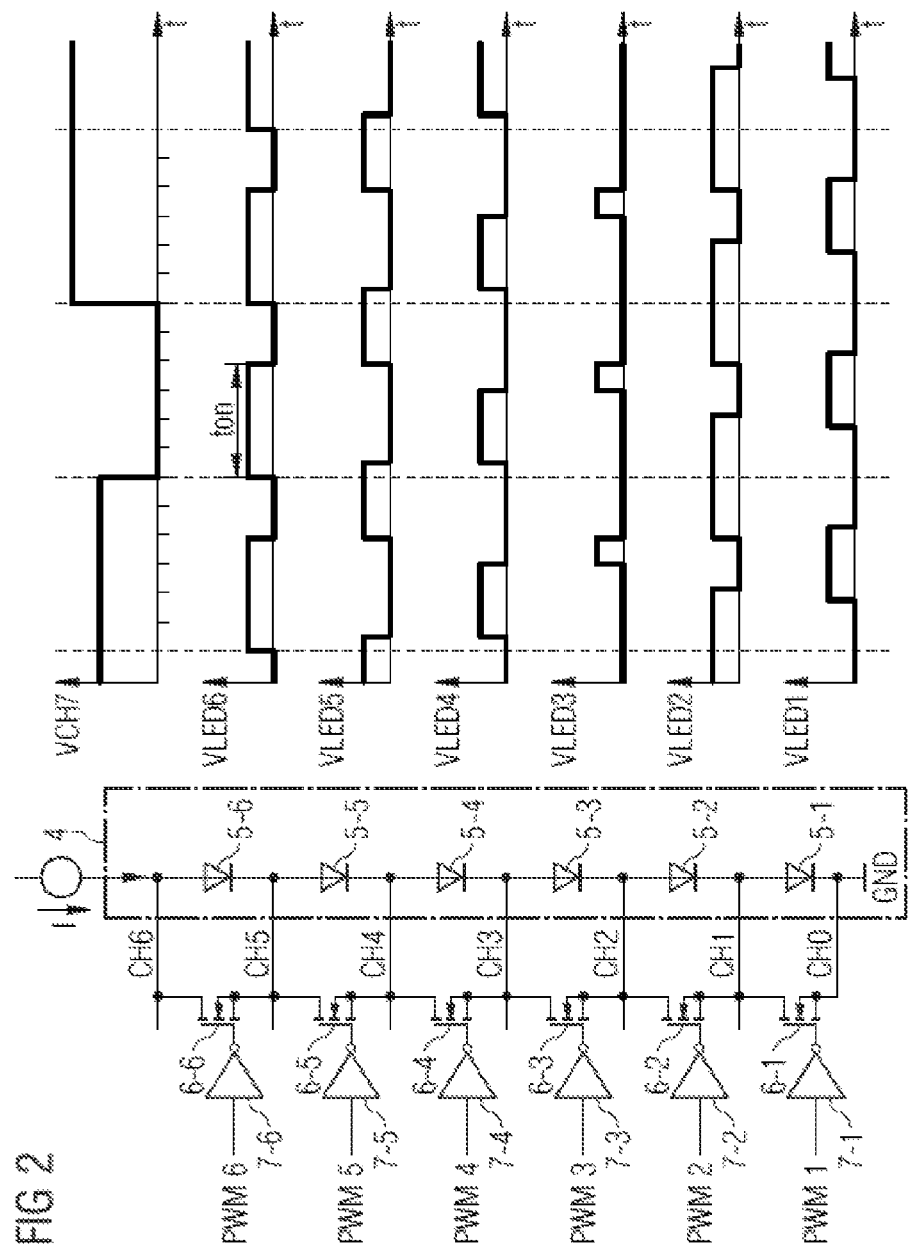
FIG. 2 illustrates a possible exemplary embodiment of a light emitting array with corresponding voltage drops of light emitting elements within said light emitting array.

FIG. 2 illustrates a possible exemplary embodiment of a light emitting array 2 controlled by PWM signals output by the driving control unit 3 of the light emitting apparatus 1. In the illustrated embodiment, the light emitting array 2 includes a single light emitting string 4 having six serial connected light emitting elements which are formed by light emitting diodes LEDs. As can be seen in FIG. 2, the light emitting string 4 includes six light emitting elements 5-1, 5-2, 5-3, 5-4, 5-5, and 5-6 connected between a high potential and a reference potential, i.e., ground GND. Each light emitting element 5-i for a correspondingly associated bypass switch 6-i is connected as illustrated in FIG. 2. The bypass switches can be formed in a possible exemplary embodiment by MOSFETs each having a gate terminal connected to a control logic of the respective light emitting element 5-*i* to receive a PWM control signal generated by a control logic provided for the respective light emitting element. In a possible embodiment, the bypass switches 6-*i* can form part of the driving control unit 3 of the light emitting apparatus 1. In an alternative embodiment, the bypass switches 6-*i* can also be integrated in the light emitting array 2. Each bypass switch 6-*i* receives a PWM control signal via a corresponding driver circuit 7-*i* as shown in FIG. 2. In the illustrated embodiment of FIG. 2, the numbers of light emitting elements 5-*i*, bypass switches 6-*i*, and driver circuits 7-*i* are equal. The numbers of light emitting elements 5-*i* and associated bypass switches 6-*i* as well as driver circuits 7-*i* can vary depending on the application. Further, the light emitting array 2 can include in further possible embodiments several light emitting strings 4 connected in parallel to each other each including a string of serial connected light emitting elements 5-*i*.

In the embodiment illustrated in FIG. 2, the light emitting element 5-*i* is turned off if the associated parallel connected bypass switch 6 formed by a MOSFET is switched on in response to a PWM control signal output via the associated driver circuit 7-*i* by the control logic of the light emitting element 5-*i* within the driving control unit 3. The light emitting element 5-*i* is turned off if the associated parallel connected bypass switch 6-*i* is switched on in response to the PWM control signal output by the control logic of the light emitting element 5-*i* provided within the driving control unit 3. The light emitting element 5-*i* connected in series with the other light emitting elements 5-*i* within the light emitting string 4 is turned on if the previous light emitting element within the light emitting string 4 is turned off. Then, the light emitting element 5-*n* within the light emitting string 4 is turned off if the previous light emitting element 5-(*n*−1) within the light emitting string 4 is turned off.

The PWM control signal output by the control logic of the light emitting element 5-*i* for the bypass switch 6-*i* associated with the light emitting element 5-*i* includes in a preferred embodiment a shift time period. After expiry of the shift time period, the bypass switch 6-*i* is switched off and the corresponding light emitting element 5-*i* is turned on. For the shift time period, a corresponding shift time counter value can be stored in a first register of the control logic of the respective light emitting element 5-*i*. The PWM control signal output by the control logic of a light emitting element 5-*i* for the bypass switch 6-*i* associated with the respective light emitting element includes an on-time period. After expiry of the on-time period, the bypass switch is switched on and the corresponding light emitting element 5-*i* is turned off.

In a possible embodiment, for the sum of the shift time period and the on-time period, a corresponding off-time counter value can be stored in a second register of the control logic of the light emitting element 5-*i*.

Figure 3:
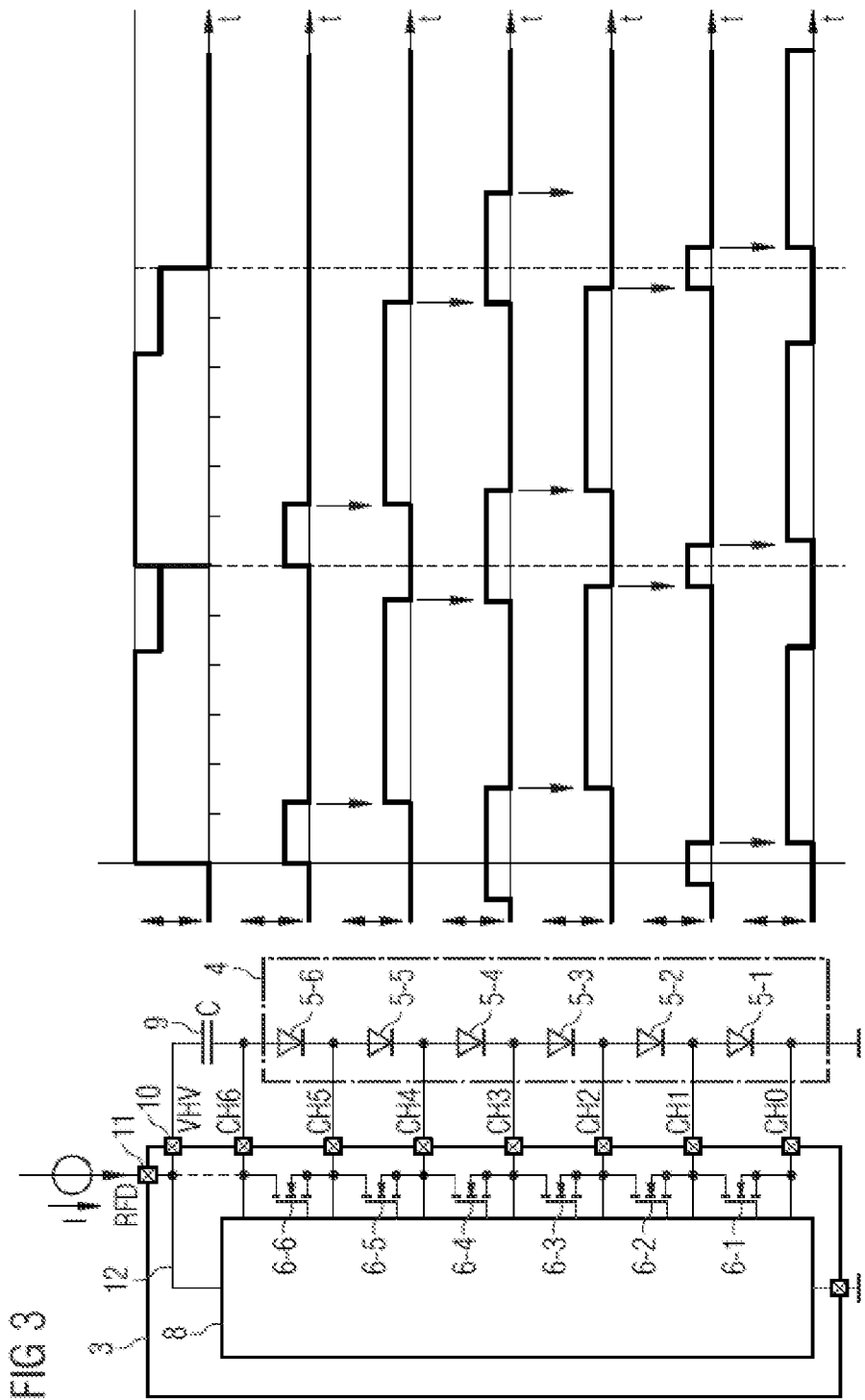
FIG. 3 illustrates a possible exemplary embodiment of a light emitting apparatus according to the first aspect of the present disclosure including a driving control circuit adapted to control a light emitting array as illustrated in FIG. 2.

FIG. 3 shows a further exemplary embodiment of a light emitting apparatus 1 according to the first aspect of the present disclosure. In the illustrated embodiment, the light emitting array 2 includes a light emitting string 4 of serial connected light emitting elements 5-*i*, wherein the light emitting elements 5-*i* are formed by LEDs. The light emitting string 4 is connected to channel pins CH0 to CH6 of the driving control unit 3 including the bypass switches 6-*i* connected in parallel to the light emitting elements 5-*i* of the light emitting string 4 as shown in FIG. 3. In the illustrated embodiment, the bypass switches 6-*i* are formed by MOS-FETs including gate terminals controlled by a controller 8 provided within the driving control unit 3. In the illustrated embodiment, the controller 8 is an LED controller configured to control the shift timing of the bypass switches 6-*i* connected in parallel to the light emitting elements 5-*i* of the light emitting string 4 to reduce a variation of a voltage drop across the light emitting string 4. In the illustrated embodiment of FIG. 3, the light emitting string 4 is connected via a capacitor 9 to a high-voltage supply pin 10 of the driving control unit 3. The driving control unit 3 can receive constant supply current at a pin 11 from a current source. The pins 10 and 11 are connected internally via a power supply line 12 also to the LED controller 8 of the driving control unit 3. In the illustrated embodiment of FIG. 3, the LED controller 8 can control individually the light intensity provided by the six LED channels. An internal bypass switch 6-*i* is provided for each LED channel controlled by a PWM control signal. An LED current source or a voltage source can be used to supply the device or to supply a charge pump. In a possible embodiment, an internal charge pump driver can generate the supply voltage for the channel driver.

Figure 4:
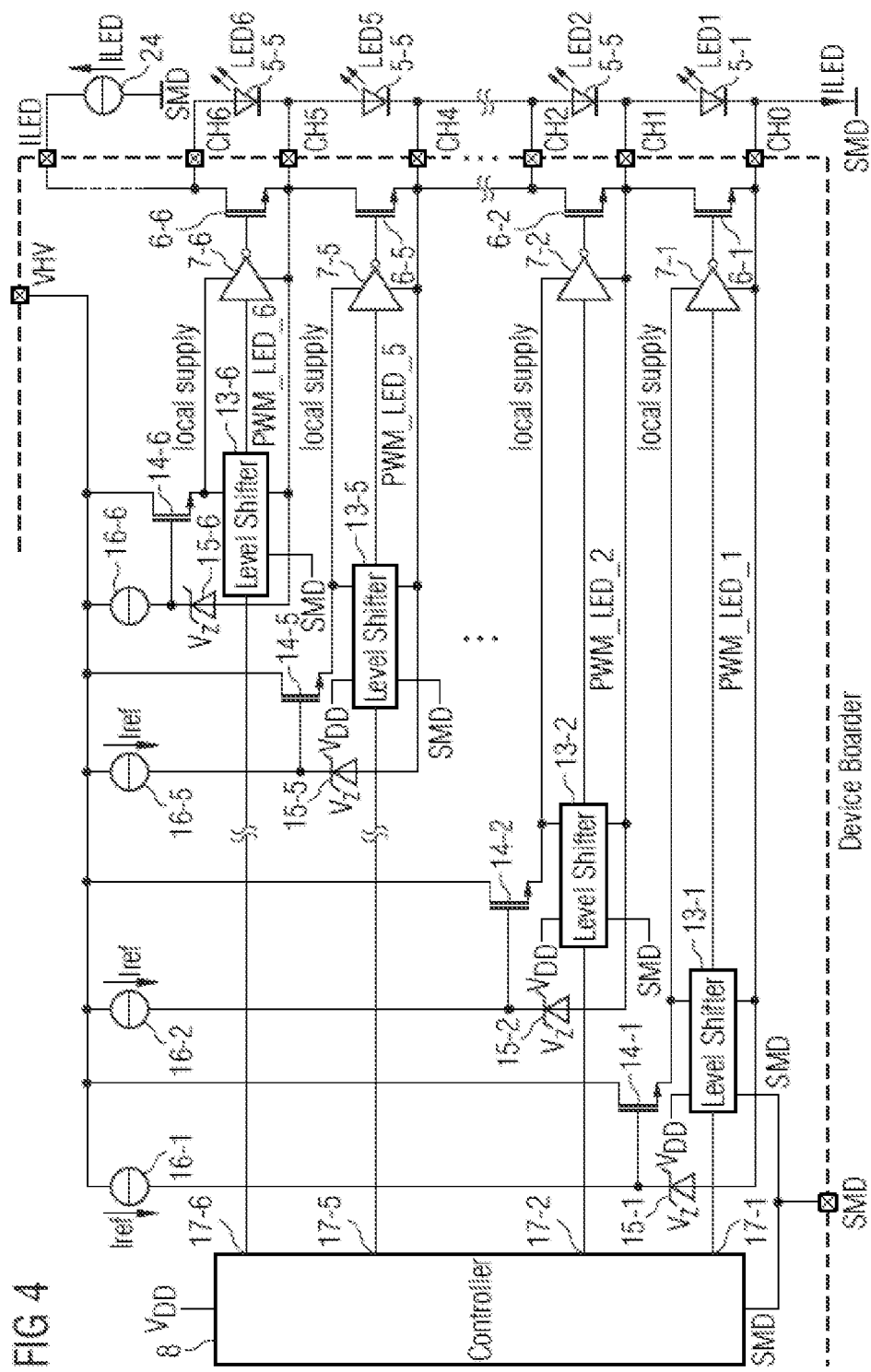
FIG. 4 shows a circuit diagram of a possible exemplary embodiment of a light emitting apparatus according to the first aspect of the present disclosure.

FIG. 4 shows a circuit diagram of a possible exemplary embodiment of a light emitting apparatus 1 according to the first aspect of the present disclosure. In the illustrated embodiment, the light emitting string 4 including six LEDs are controlled by the driving control unit 3 including in the illustrated embodiment MOSFETs 6-*i* operating as bypass switches for the respective LED elements. Each MOSFET is driven by a driver circuit 7-*i* as shown in FIG. 4. The driving control unit 3 includes in the illustrated embodiment of FIG. 4 for each channel a level shifter 13-*i* as shown in FIG. 4. Each level shifter 13-*i* is provided between the control output of the LED controller 8 and the input of the driver circuit 7-*i* of the respective channel. Each channel level shifter 13-*i* is provided for shifting the PWM control signal. As shown in FIG. 4, each driver circuit 7-*i* and level shifter 13-*i* can include a local power supply provided by a MOSFET 14-*i* and a Zener diode 15-*i* connected to a reference current source 16-*i* of the driving control unit 3. The LED controller 8 includes for each channel a control terminal 17-*i*. The LED controller 8 is a digital controller adapted to control the shift timing of the bypass switches 6-*i* to reduce a variation of a voltage drop across the light emitting string 4. The voltage drop is controlled automatically such that the voltage drop is as constant as possible thus reducing flickering of the emitted light and/or stroboscopic effects caused by the emitted light.

In a possible embodiment, the digital LED controller 8 of the driving control unit 3 includes for each light emitting element 5-*i* or channel an associated integrated control logic adapted to generate a PWM control signal for the associated bypass switch 6-*i* of the light emitting element 5-*i* output at the control terminal 17-*i* of the respective channel.

Figure 5:
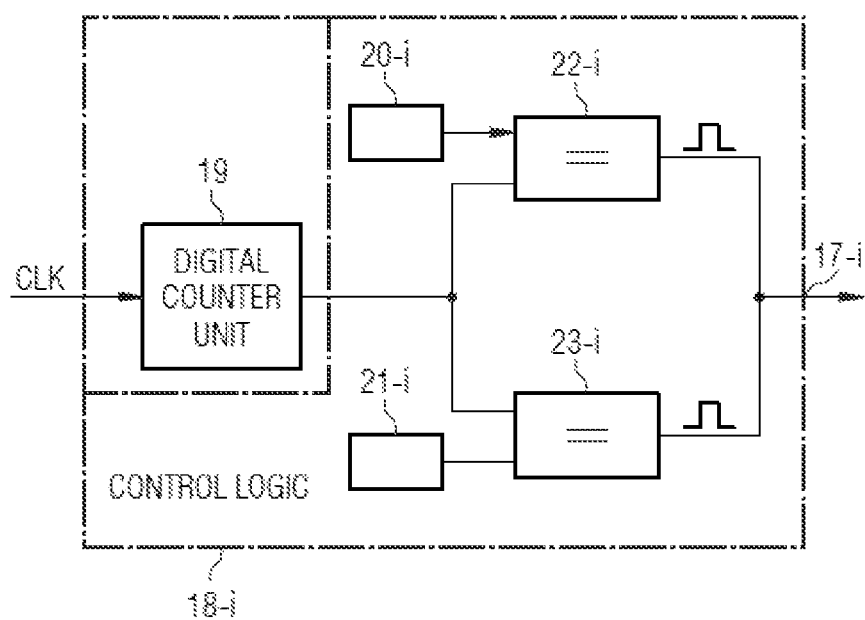
FIG. 5 shows a block diagram of a possible exemplary embodiment of a control logic within a driving control unit of a light emitting apparatus according to the first aspect of the present disclosure.

FIG. 5 illustrates a block diagram of a possible exemplary embodiment of a control logic 18 integrated in the digital LED controller 8 for providing a PWM control signal of an LED channel. The PWM control signal output by the control logic 18-*i* of an associated light emitting element 5-*i* is supplied via the corresponding level shifter 13-*i* and the driver circuit 7-*i* to the gate of the bypass MOSFET 6-*i* connected in parallel to the respective LED element. The output PWM control signal includes a shift time period, wherein after expiry of the shift time period, the bypass switch 6-*i* is switched off and the corresponding light emitting element 5-*i* is turned on.

In the illustrated embodiment of FIG. 5, the control logic 18-*i* is connected to a digital counter unit 19. The digital counter unit 19 can receive a clock signal from a clock generator of the driving control unit 3. In a possible implementation, the digital counter unit 19 can provide a 10-bit counter value. In a possible embodiment, a shift time counter value corresponding to the shift time period can be stored in a first register 20-$i$ of the respective control logic 18-$i$ of the respective light emitting element 5-$i$. The PWM control signal output by the control logic 18-$i$ of a light emitting element 5-$i$ for the bypass switch 6-$i$ associated with the respective light emitting element 5-$i$ includes an on-time period. After expiry of the on-time period, the bypass switch is switched on and the corresponding light emitting element 5-$i$ is turned off. In a possible embodiment, the corresponding off-time counter value for the sum of the shift time period and the on-time is stored in a second register 21-$i$ of the control logic 18-$i$ provided for the respective light emitting element 5-$i$.

As can be seen in the embodiment of FIG. 5, the control logic 18-$i$ includes further a first comparator 22-$i$ and a second comparator 23-$i$. Both comparators 22-$i$ and 23-$i$ are adapted to generate a single trigger pulse if a counter value is equal to the value stored in the associated registers 20-$i$ and 21-$i$. The first comparator 22-$i$ is adapted to generate a trigger pulse to switch off automatically the bypass switch 6-$i$ associated with the respective light-emitting element 5-$i$ to turn on the light emitting element 5-$i$ if a counter value generated by the digital counter unit 19 is equal to the shift time counter value stored in the first register 20-$i$ of the control logic 18-$i$. The second comparator 23-$i$ is adapted to generate a trigger pulse to switch on automatically the bypass switch 6-$i$ associated with the respective light emitting element 5-$i$ to turn off the light emitting element 5-$i$ if the counter value generated by the digital counter unit 19 is equal to the off-time counter value stored in the second register 21-$i$ of the control logic 18-$i$.

Figure 6:
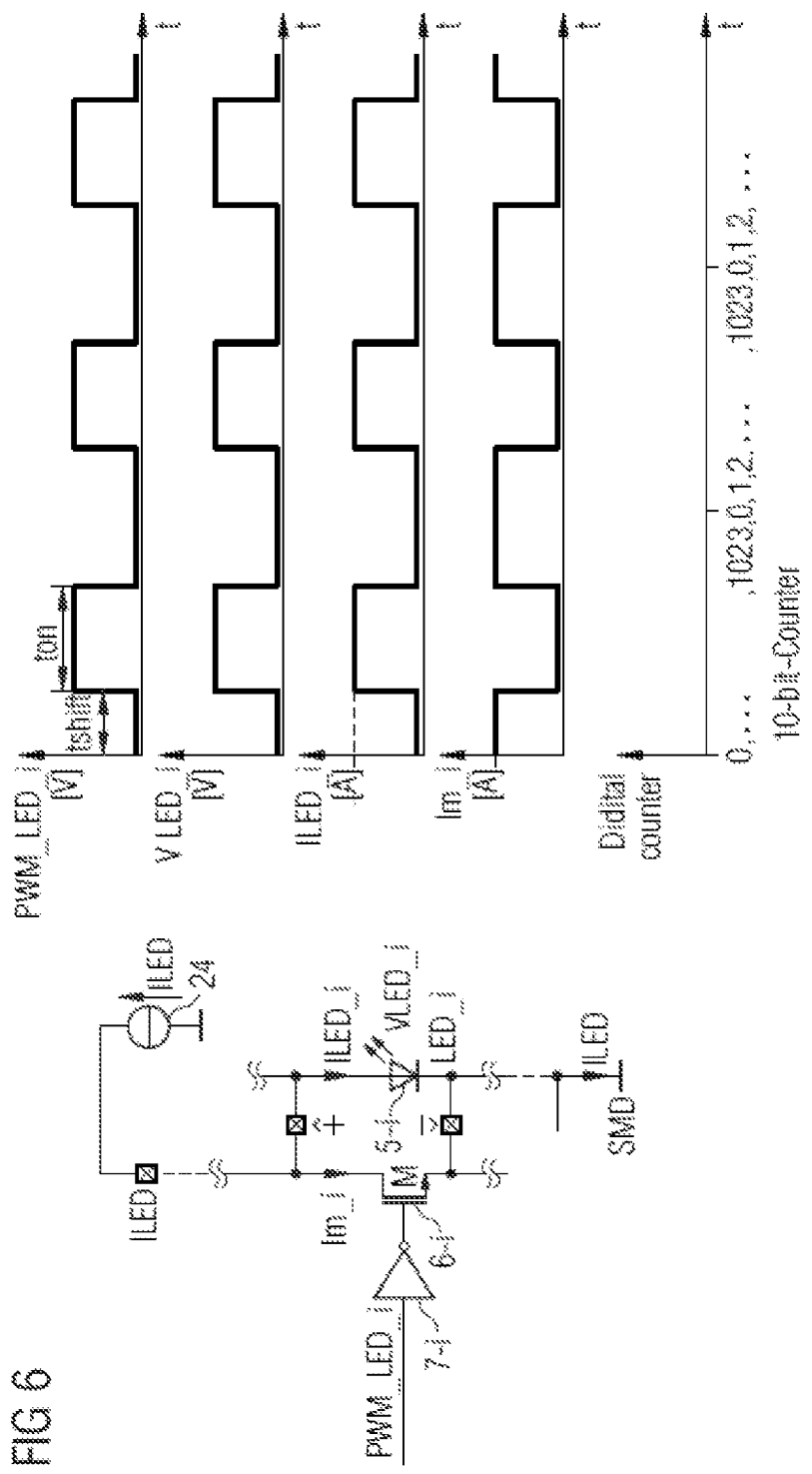
FIG. 6 shows a circuit diagram and signal diagrams to illustrate the driving of light emitting element by a driving control unit of a light emitting apparatus according to the first aspect of the present disclosure.

The control of the bypass switch 6-$i$ in response to the PWM control signal generated by the control logic 18-$i$ can be supplied via a level shifter 13-$i$ as illustrated in more detail with respect to FIG. 6. Through the on-time period, the bypass switch or MOSFET 6-$i$ is switched on and a current flows through the LED element 5-$i$ as shown in FIG. 6. The bypass switch 6-$i$ can be provided within the driving control unit 3 receiving a supply current from a current source 24 as shown in FIGS. 4 and 6. In the illustrated embodiment, the driver circuit 7-$i$ can be implemented by an inverter.

Figure 7:
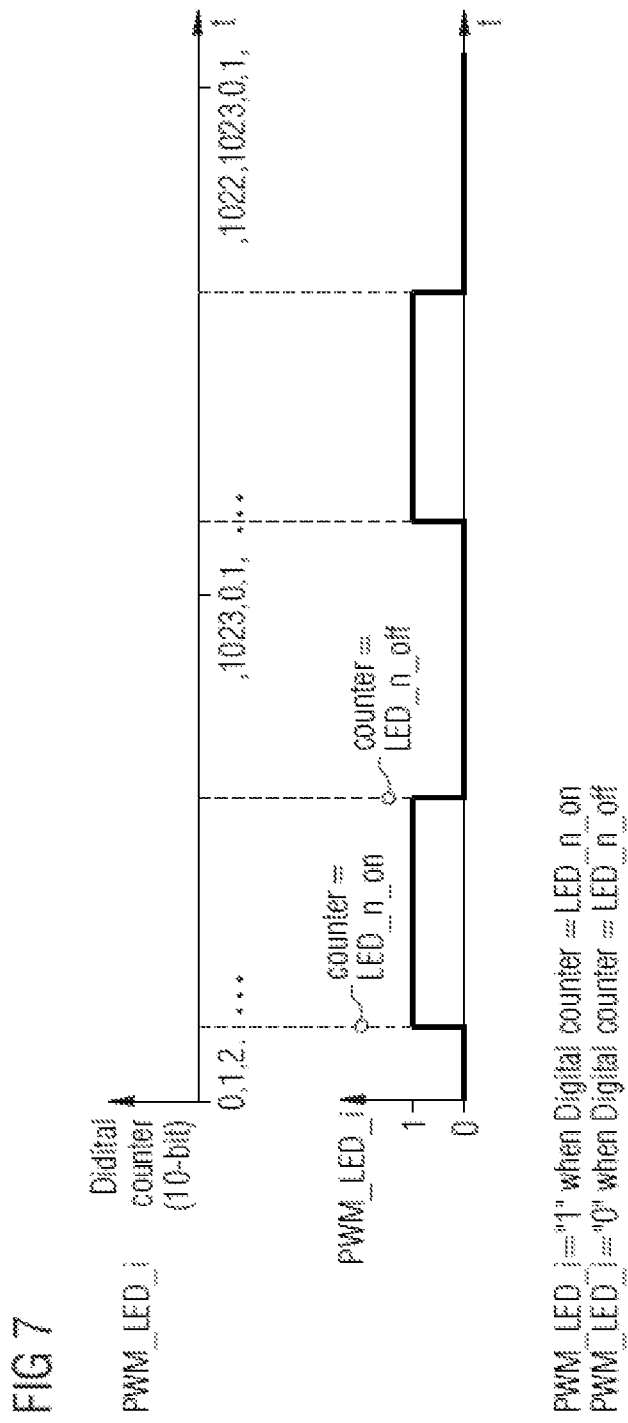
FIG. 7 shows a timing diagram for illustrating the operation of a light emitting apparatus according to the first aspect of the present disclosure.

FIG. 7 shows a digital PWM LED control signal PWM_LED_$i$ provided by a control logic 18-$i$ as shown in FIG. 5. The digital counter unit 19 provides a digital counter value which can include in a possible implementation a 10-bit counter value. The 10-bit counter value can generate counter values 0 to 1023 as illustrated in FIG. 7. The PWM LED control signal PWM_LED_$i$ output by the control logic 18-$i$ is logically high when the digital counter value reaches the on-time counter value. As soon as the digital counter value reaches the off-time counter value, the PWM LED control signal PWM_LED_$i$ becomes logically low as illustrated in FIG. 7.

Figure 11:
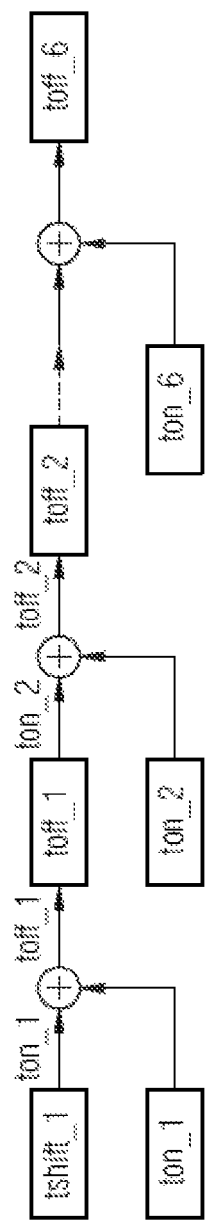
FIG. 11 shows a schematic diagram for illustrating a shift setting for a head tail shift as performed in a possible exemplary embodiment of a light emitting apparatus according to the first aspect of the present disclosure.

In a possible embodiment, a user can set the $t_{on}$ times for different light emitting elements LED 6-1 to LED 6-6 and a first shift value $t_{shift}$ LED Δ as also illustrated in FIG. 11.

Generating PWM_LED_$i$ inside digital "core" programmed value by user $j$ (10-bit-code) for head tail function ton_LED_1   ;   t shift_LED_1
ton_LED_2   ;
ton_LED_3
ton_LED_4
ton_LED_5
ton_LED_6

Calculation inside digital "core" for head tail function

LED_1_on = t shift_LED_1     LED_1_off = t shift_LED_1 + ton_LED_1
LED_2_on = LED_1_off          LED_2_off = LED_1_off + ton_LED_2
LED_3_on = LED_2_off          LED_3_off = LED_2_off + ton_LED_3
.                                              .
.                                              .
.                                              .
LED_6_on = LED_5_off          LED_6_off = LED_5_off + ton_LED_6

Within the digital core, a calculation is performed for the head tail function. As can be seen, an optimum shift value does result in a minimum variation on the LED pin and a minimum variation of the emitted light is calculated and generated automatically by the digital core. In conventional products, a customer has to program the LED on-value and the LED off-value. In contrast, when using the LED controller 8, it is not necessary to calculate for each setting an optimal value before programming. A customer has only to set the $t_{on}$ time and a first shift value. The controller 8 provides a phase shift function to optimize the LED light intensity and the voltage load for the current driver. The controller 8 can provide a head tail phase shift function where the PWM cycle is controlled such that the next cycle starts when the previous cycle stops. By setting a register head tail, the next light-emitting element 5-$i$ within the string 4 will start when the previous LED stops. The light emitting element 5-$i$ connected in series with other light emitting elements within the same light emitting string 4 is turned off if the previous light emitting element 5-($i$−1) within the light emitting string 4 is turned off.

Figure 8:
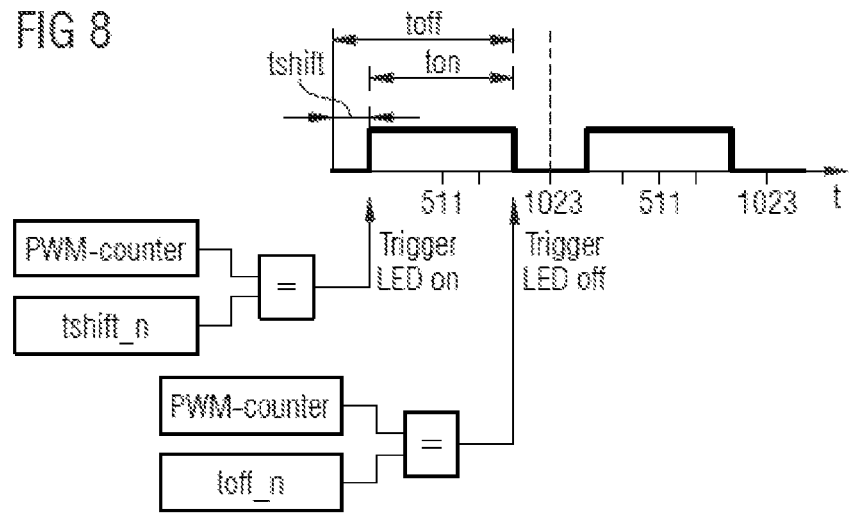
FIG. 8 illustrates the generation of a trigger signal to turn on or off a light emitting element in a possible exemplary embodiment of a light emitting apparatus according to the first aspect of the present disclosure.

FIG. 8 illustrates the generation of a trigger signal to turn on and off a light-emitting element 5-$i$ in a possible implementation. A PWM block counter can be used as a main counter for all LED PWM control signals. For each LED, a PWM on-time and a PWM shift-time can be set. A shift value can indicate at which digital code or counter value of the PWM block counter the associated bypass switch 6-$i$ of the LED element 5-$i$ is turned off, i.e., the LED is turned on.

Figure 9:
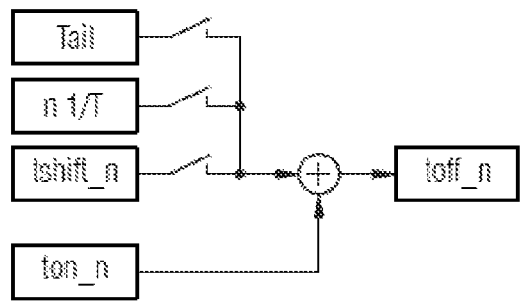
FIG. 9 shows a schematic diagram for illustrating a possible exemplary embodiment of a light emitting apparatus according to the first aspect of the present disclosure.

In a possible exemplary embodiment, a customer has the possibility to select head tail shifting mode as illustrated in FIG. 9. The shift counter value indicates at which digital code of the PWM block counter the bypass switch is triggered to turn off, i.e., the load current is turned on. The $t_{on}$ time is the amount of counts that the load current is on. The sum of the $t_{on}$ time and the $t_{shift}$ time is the trigger code of the PWM block counter where the bypass switch is turned on, i.e., the load current is off.

Figure 10:
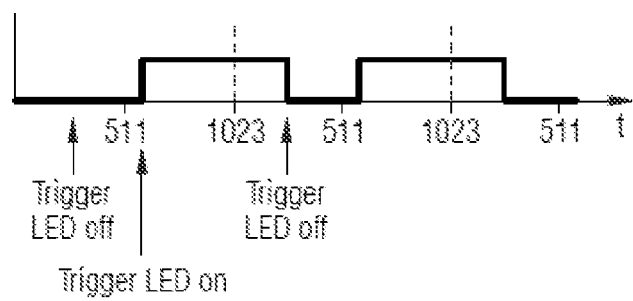
FIG. 10 shows a further timing diagram for illustrating the operation of a possible exemplary embodiment of a light emitting apparatus according to the first aspect of the present disclosure.

The PWM counter number to trigger a light emitting element 5-$i$ on can be lower than the PWM count number to turn the LED off as illustrated in FIG. 10. This is because the counter value generated by the digital counter unit including ten bits recommences with a zero value when the maximum value of 1023 has been reached.

When selecting a head tail phase shift, the PWM cycle is controlled such that the next cycle starts when the previous cycle stops as illustrated in FIG. 11. Setting the register Head_tail, the next LED will start when the previous stops. Only the programmed phase shift of the selected first PWM register has to be set by the customer or user. As can be seen in FIG. 11, the user sets only the $t_{on}$ time and sets the first shift value. After that, an automatic generation of an optimum shift value does result in a minimum variation of a voltage drop across the light emitting string 4 which does result in a minimum variation of the output light and reduced flickering.

Figure 12:
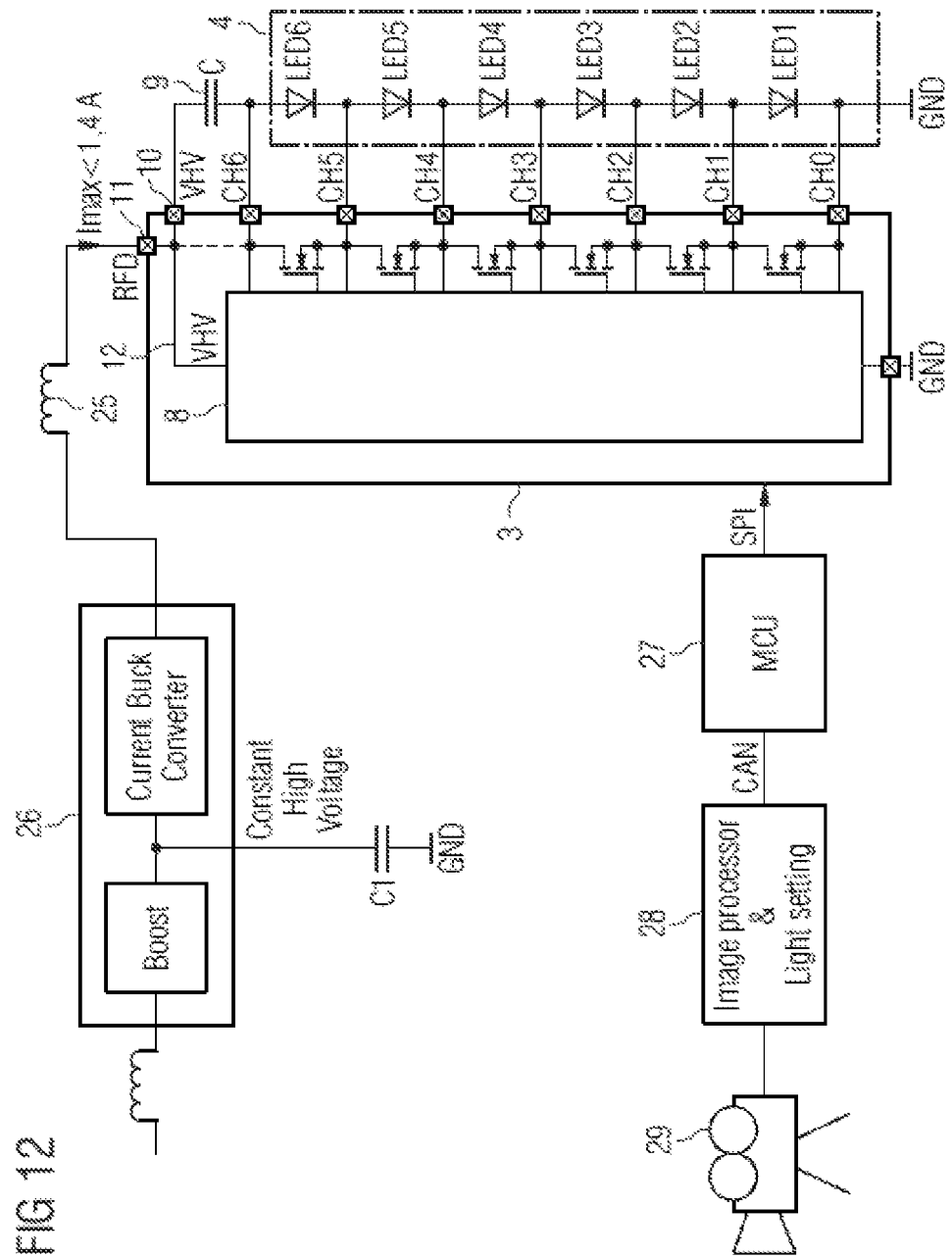
FIG. 12 shows a possible exemplary embodiment of a light emitting system according to a further aspect of the present disclosure.

FIG. 12 shows a block diagram of a possible exemplary embodiment of a light emitting system including at least one driving control unit 3 adapted to control light emitting string 4 of a light emitting array 2. In the illustrated embodiment, the driving control unit 3 receives a constant supply current via a coil 25. In the illustrated embodiment, the driving control unit 3 includes an SPI communication interface which can be used for diagnostic functions, to preset light patterns for setting a device mode and/or to set a PWM frequency. In the illustrated embodiment, the SPI communication interface connects an MCU 27 with the driving control unit 3. The MCU 27 is connected in the illustrated embodiment via a CAN bus to an image processor 28 connected to a camera 29. The channel driver or digital controller 8 is configured to provide an automatic shift setting to reduce stroboscopic and light flickering effects. The light emitting array 2 including the light emitting string 4 as shown in FIG. 12, form part of a head lamp of a vehicle. In the illustrated embodiment of FIG. 12, the matrix controller 8 is used to control six LED channels. Further embodiments of the light emitting system illustrated in FIG. 12 with several matrix controllers 8 can be used for controlling a higher number of LED channels. For instance, eight matrix controllers 8 can be used to control 48 LED channels. In a possible embodiment, the bypass switches 6-$i$ are formed by transistors, in particular MOSFETs. In an alternative embodiment, the bypass switches 6-$i$ can also be formed by electromechanical elements such as relay circuits. The present disclosure provides according to an aspect an LED controller 8 providing a head tail shift setting function. Through the SPI interface, a PWM light pattern can be selected or reprogrammed. The controller 8 can include in a possible implementation internal registers for each channel to reprogram PWM light patterns (PWM duty and shift). In a possible embodiment, for each LED channel, the controller 8 can include an open and short detection circuit which can be used to bypass the internal switch when an LED has a malfunction. Further, the apparatus 1 can include in a possible embodiment an over-temperature sensor creating a warning signal when the device is overheating. An internal charge pump driver can generate in a possible embodiment the supply voltage for the channel driver.

The method and apparatus according to the present disclosure can be used for a wide range of light emitting systems provided for instance in buildings or vehicles.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A light emitting apparatus comprising:
   a light emitting array having at least one light emitting string of serial connected light emitting elements, wherein a bypass switch is connected in parallel to each light emitting element of said light emitting string; and
   a driving control unit controlling a shift timing of the bypass switches to reduce a variation of a voltage drop across the light emitting string,
   wherein the driving control unit comprises for each light emitting element a control logic adapted to generate a pulse width modulation (PWM) control signal for the associated bypass switch of said light emitting element,
   wherein the PWM control signal output by the control logic associated with a light emitting element for the bypass switch associated with said light emitting element comprises a shift time period,
   wherein after expiry of the shift time period, the bypass switch is switched off and the corresponding light emitting element is turned on, and
   wherein for the shift time period, a corresponding shift time counter value is stored in a first register of the control logic of the respective light emitting element.

2. The light emitting apparatus according to claim 1, wherein the light emitting element is turned off if the associated parallel connected bypass switch is switched on in response to the PWM control signal output by the control logic associated with said light emitting element provided within said driving control unit.

3. The light emitting apparatus according to claim 1, wherein the light emitting element connected in series with other light emitting elements within the light emitting string is turned on if the previous light emitting element within the light emitting string is turned off.

4. The light emitting apparatus according to claim 1, wherein the PWM control signal output by the control logic of a light emitting element for the bypass switch associated with the respective light emitting element comprises an on-time period, and
   wherein after expiry of the on-time period, the bypass switch is switched on and the corresponding light emitting element is turned off.

5. The light emitting apparatus according to claim 4, wherein for the sum of the shift time period and the on-time period, a corresponding off-time counter value is stored in a second register of the control logic of said light emitting element.

6. The light emitting apparatus according to claim 5, wherein the control logic associated with a light-emitting element comprises:
   a first comparator adapted to generate a trigger pulse to switch off automatically the bypass switch associated with the respective light emitting element to turn on the light emitting element if a counter value generated by a digital counter unit is equal to the shift time counter value stored in the first register of the control logic of the respective light emitting element; and
   a second comparator adapted to generate a trigger pulse to switch on automatically the bypass switch associated with the respective light emitting element to turn off the light emitting element if the counter value generated by the digital counter unit is equal to the off-time counter value stored in the second register of the control logic of the respective light emitting element.

7. The light emitting apparatus according to claim 1, wherein the bypass switch is a metal oxide semiconductor field effect transistor (MOSFET) having a gate terminal connected to the control logic of the respective light emitting element to receive the PWM control signal generated by said control logic.

8. The light emitting apparatus according to claim 1, wherein the light emitting elements comprise one or both of light emitting diodes (LEDs) and organic light emitting diodes (OLEDs).

9. An LED controller configured to control a shift timing of bypass switches connected in parallel to light emitting elements of at least one light emitting string to reduce a variation of a voltage drop across the light emitting string, the LED controller comprising for each light emitting element a control logic adapted to generate a pulse width modulation (PWM) control signal for the associated bypass switch of said light emitting element,
  wherein the PWM control signal output by the control logic associated with a light emitting element for the bypass switch associated with said light emitting element comprises a shift time period,
  wherein after expiry of the shift time period, the bypass switch is switched off and the corresponding light emitting element is turned on, and
  wherein for the shift time period, a corresponding shift time counter value is stored in a first register of the control logic of the respective light emitting element.

10. A light emitting system comprising at least one LED controller according to claim 9 adapted to control at least one light emitting string of said light emitting system.

* * * * *